United States Patent
Parkhou et al.

(10) Patent No.: US 9,217,420 B2
(45) Date of Patent: Dec. 22, 2015

(54) TEST SYSTEM FOR WIND TURBINE DUMP LOAD

(75) Inventors: Masoud Parkhou, Aarhus N. (DK); Bing Li, Singapore (SG); Michael Casem Tumabcao, Singapore (SG)

(73) Assignee: Vestas Wind Systems A/S, Aarhus N. (DK)

( * ) Notice: Subject to any disclaimer, the term of this patent is extended or adjusted under 35 U.S.C. 154(b) by 392 days.

(21) Appl. No.: 13/576,137

(22) PCT Filed: Feb. 2, 2011

(86) PCT No.: PCT/DK2011/050027
§ 371 (c)(1),
(2), (4) Date: Oct. 15, 2012

(87) PCT Pub. No.: WO2011/095169
PCT Pub. Date: Aug. 11, 2011

(65) Prior Publication Data
US 2013/0033268 A1 Feb. 7, 2013

Related U.S. Application Data

(60) Provisional application No. 61/300,598, filed on Feb. 2, 2010.

(30) Foreign Application Priority Data

Feb. 2, 2010 (DK) ................... 2010 70033

(51) Int. Cl.
F03D 11/00 (2006.01)
H02M 1/32 (2007.01)
(Continued)

(52) U.S. Cl.
CPC ............. *F03D 11/00* (2013.01); *F05B 2260/80* (2013.01); *F05B 2260/83* (2013.01); *H02M 1/32* (2013.01); *Y02E 10/722* (2013.01); *Y02E 10/76* (2013.01)

(58) Field of Classification Search
CPC ....... F03D 7/0272; F03D 11/00; F03D 9/003; H02M 1/32; H02P 9/105; H02P 2009/004; H03D 7/00; H02J 3/386; F05B 2260/80; F05B 2260/83; Y02E 10/76; Y02E 10/722; G01R 31/025; G01R 31/02; G01R 31/88; G01R 31/085; G01R 31/08; G01R 31/086; G01R 31/2829; G01R 31/14; G01R 19/145; G01M 3/165
USPC .................. 324/511–512; 290/43–44; 322/37
See application file for complete search history.

(56) References Cited

U.S. PATENT DOCUMENTS

2003/0015873 A1   1/2003 Khalizadeh et al.
2009/0079193 A1*  3/2009 Nielsen et al. ................. 290/44
(Continued)

FOREIGN PATENT DOCUMENTS

DE   102008025944 A1   12/2009
EP       1819023 A2     8/2007
EP       1863162 A2    12/2007

OTHER PUBLICATIONS

Danish Search Report dated Sep. 7, 2010 for Danish Patent Application PA 2010 70033.
(Continued)

*Primary Examiner* — Melissa Koval
*Assistant Examiner* — Felicia Farrow
(74) *Attorney, Agent, or Firm* — Patterson & Sheridan, LLP (57) ABSTRACT

The present invention relates to a dump load applied in a wind turbine generator; normally it is only operating to absorb the energy during faults. Therefore in the majority time of wind turbine generator operation, the dump load is not applied, and its health condition is unknown. This invention is about a method to check the dump load condition during normal operation.

19 Claims, 7 Drawing Sheets

(51) Int. Cl.
*G01R 31/14* (2006.01)
*G01R 31/08* (2006.01)

(56) References Cited

U.S. PATENT DOCUMENTS

2010/0094474 A1* 4/2010 Larsen et al. ................ 700/287
2011/0181045 A1* 7/2011 Letas et al. ...................... 290/44
2012/0056429 A1* 3/2012 Hagedorn ........................ 290/44

OTHER PUBLICATIONS

International Search Report dated Sep. 21, 2011 for PCT Application PCT/DK2011/050027.

* cited by examiner

TEST SYSTEM FOR WIND TURBINE DUMP LOAD

FIELD OF THE INVENTION

The present invention relates to improving the function of a critical component in a wind turbine generator.

BACKGROUND OF THE INVENTION

A wind turbine generator is an energy converting system which converts kinetic wind energy into electrical energy for utility power grids. Specifically, wind is applied to wind turbine blades of the wind turbine to rotate a rotor. The mechanical energy of the rotating rotor in turn is converted into electrical energy by an electrical generator.

Because wind speed fluctuates, the force applied to the wind blades and hence the rotational speed of the rotor can vary. Electrical power grids however require a constant frequency electrical power to be provided by the wind turbine.

One type of wind turbine generator is a variable speed wind turbine. This type of wind turbine generator allows the generator to rotate at variable speeds to accommodate for fluctuating wind speeds. By varying the rotating speed of the generator rotor, energy conversion can be optimized over a broader range of wind speeds.

A variable speed wind turbine usually includes an electrical power converter having a generator side converter coupled to a grid side converter via a direct current (DC) link. The generator side converter regulates the power of the generator. This power passes through the DC-link, fully or partially, and is eventually fed to the grid through the grid side converter.

Conventionally, when there is a fault in the grid, the wind turbine generator (or wind power plant comprising wind turbine generators) is usually disconnected from the grid to protect the electrical components and mechanical parts of the turbine due to relaxed grid code requirements. Subsequently, when the fault is cleared, the wind turbine is reconnected to the grid again to supply power thereto.

With increasing penetration of wind power generation, the disconnection of wind turbines generators or wind power plants from the grid during grid faults is no longer acceptable by grid operators. This is because the disconnection of wind turbines generators or wind power plants under grid fault condition leads to instability of the power grid. Grid operators in many countries now require wind farm operators to comply with certain grid requirements specified in grid codes before they are allowed to connect to the grid. Grid requirements vary in different countries, but they have a common aim of permitting the development, maintenance and operation of a coordinated, reliable and economical transmission or distribution system. For example, grid codes typically require that wind turbines should be able to ride-through a fault causing the voltage at a Point of Common Coupling (PCC) at a wind power plant.

U.S. Pat. No. 6,921,985 discloses the use of a shunt circuit or a crowbar circuit to shunt the sudden surge of current during a grid fault, such as a voltage dip. The crowbar circuit is coupled to a point between the generator side converter and the generator rotor. When a sudden increase in the current at the generator side converter is detected, the crowbar circuit is activated, and the current is drained from the generator side converter by the crowbar circuit.

U.S. Pat. No. 7,411,309 also discloses the use of a crowbar circuit during voltage transients at the grid. The crowbar circuit is coupled to the DC link between the generator side converter and the grid side converter. When the DC link voltage exceeds a predetermined value (due to grid fault), the crowbar circuit is activated to drain the current from the generator side converter, hence lowering the DC link voltage.

In both the prior art documents, the shunt circuits use resistors to drain any undesired surge of current or dissipate any excess power generated due to grid faults As the power output of the wind turbines are large, the shunt circuit need to use high mega joules resistors in order to dissipate excess power from the generator. In addition, the heat generated by the power dissipating resistors needs to be handled.

The objective of the present invention is to improve the function of critical components in a wind turbine generator. By this critical components will be checked and maintained in a health condition. If using the critical component, it is important to know that it will work. The wind turbine generator down time can be reduced if the required critical components are functioning as needed.

SUMMARY OF THE INVENTION

This Summary is provided to introduce a selection of concepts in a simplified form that are further described below in the Detailed Descriptions. This Summary is not intended to identify key features or essential features of the claimed subject matter, nor is it intended to be used as an aid in determining the scope of the claimed subject matter.

According to a first aspect, the invention relates to a method of improving the function of a component in a wind turbine generator, wherein the method comprises testing a dump load circuit with the steps of:

Performing a first measurement of a at east one signal within the wind turbine, activating the dump load circuit, performing a second measurement of the at least one signal after the activating of the dump load circuit.

An advantage of this aspect is that the present invention provides a simple test method for a dump load circuit in a wind generator during normal operation mode. It will improve the dump load circuit reliability by providing the real time health condition and thus it will improve the reliability of the wind turbine generator and its capability of riding through a grid fault.

According to one embodiment of the invention the method is performed during non-fault operation of the wind turbine generator.

An advantage of this embodiment is that normally the dump load health is not checked. If the dump load is faulty, the wind turbine generator can not be controlled during fault operation, then the control system will understand that the dump load is failed, but it is too late, because stored energy could leads to fatal overvoltage and IGBT modules could be damaged instantly, and the wind turbine generator might shutdown with a failed power converter.

According to one embodiment of the invention the dump load circuit is connected to a DC link of a power electronic converter, for converting electrical power to a power supply grid.

An advantage of this embodiment is that DC link voltage can not be controlled during fault operation unless there is a functioning DC link dump load. If the dump load is faulty the control system will understand it but too late, because the stored energy in DC link would be very high and it leads to fatal overvoltage and probably IGBT modules will be damaged instantly and the wind turbine generator might shutdown with a failed power converter in the condition of a grid fault.

According to one embodiment of the invention the dump load circuit is connected to an AC side of a generator.

An advantage of this embodiment is that normally the dump load health is not checked. If the dump load is faulty, the wind turbine generator can not be controlled during fault operation, and then the control system will understand that the dump load is failed, but it is too late, because stored energy could leads to over speed and high torque pulsations in the wind turbine generator drive train.

According to one embodiment of the invention the at least one signal is a DC link voltage measurement.

An advantage of this embodiment is that it gives a fast response in DC link voltage level when the dump load is activated, without causing too high torque pulsation.

According to one embodiment of the invention the at least one signal is a temperature measurement of at least one dump resistor being part of the dump load circuit.

An advantage of this embodiment is that it is an easy way monitor that energy in fact has been dissipated in the dump resistor and that the dump load circuit is working.

According to one embodiment of the invention the method is performed regularly, and wherein the result is accumulated for each test.

An advantage of this embodiment is that the status of the dump load is dependent on multiple numbers of tests. Each single failed test should be registered and could be added to a counter. If the number in the counter is higher compared to other similar turbines it is likely the dump load is malfunctioned.

According to one embodiment of the invention the dump load circuit is activated a number of times for short periods by means of pulses generated via a controller.

An advantage of this embodiment is that the operating with a number of short periods by means of pulses, the DC link voltage level will not drop as deep as if all the energy was dissipated into the resistor at once and without causing too high torque pulsation in the wind turbine generator drive train.

According to a second aspect, the invention relates to a component in a wind turbine generator comprising at least a test system for a test wherein said component being a dump load circuit, the test system comprises:

A sensor for performing a first and second measurement of at least one signal within the wind turbine before and after activation of the dump load circuit;

a processor for comparing the first and second measurements of the at least one signal.

The advantages of the second are equivalent to the advantages for the first aspect of the present invention.

Many of the attendant features will be more readily appreciated as the same become better understood by reference to the following detailed description considered in connection with the accompanying drawings. The preferred features may be combined as appropriate, as would be apparent to a skilled person, and may be combined with any of the aspects of the invention.

DETAILED DESCRIPTION OF THE INVENTION

The present invention will now be explained in further details. While the invention is susceptible to various modifications and alternative forms, specific embodiments have been disclosed by way of examples. It should be understood, however, that the invention is not intended to be limited to the particular forms disclosed. Rather, the invention is to cover all modifications, equivalents, and alternatives falling within the spirit and scope of the invention as defined by the appended claims.

Figure 1:
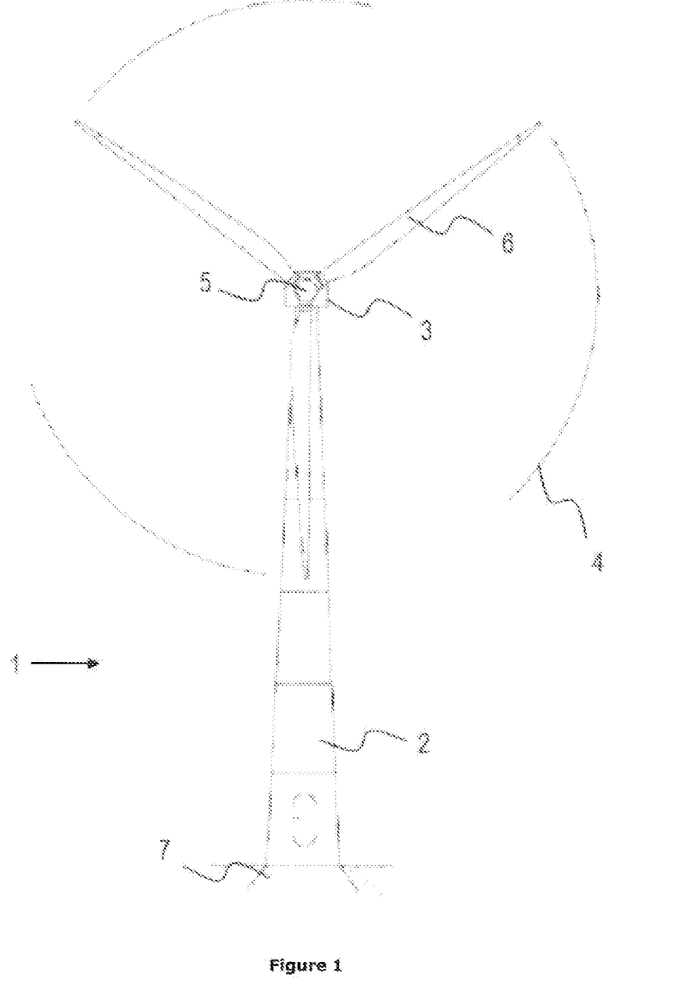
FIG. 1 shows a wind turbine generator according to the present invention

FIG. 1 shows a general setup of a wind turbine generator 1. The wind turbine generator 1 includes a tower 2 having a number of tower sections, a nacelle 3 positioned on top of the tower 2, and a rotor 4 extending from the nacelle 3. The tower 2 is erected on a foundation 7 built in the ground. The rotor 4 is rotatable with respect to the nacelle 3, and includes a hub 5 and one or more blades 6. Wind incident on the blades 6 causes the rotor 4 to rotate with respect to the nacelle 3. The mechanical energy from the rotation of the rotor 4 is converted into electrical energy by a generator 9 in the nacelle 3. The electrical energy is subsequently converted, first by a generator side converter 110 that converts the variable frequency energy into direct current 112. Then a grid side converter 111 converts the energy into a fixed frequency electrical power to be supplied to a power grid 107. The wind turbine generator 1 may also form part of a wind power plant comprising a plurality of wind turbines generators 1.

Although the wind turbine generator 1 shown in FIG. 1 has three blades 6, it should be noted that a wind turbine generator may have different number of blades. It is common to find wind turbines having one to four blades. The wind turbine generator 1 shown in FIG. 1 is a Horizontal Axis Wind turbine (HAWT) as the rotor 4 rotates about a horizontal axis. It should be noted that the rotor 4 may rotate about a vertical axis. Such a wind turbine generator having its rotor rotates about the vertical axis is known as a Vertical Axis Wind Turbine (VAWT). The embodiments described henceforth are not limited to HAWT having 3 blades. They may be implemented in both HAWT and VAWT, and having any number of blades 6 in the rotor 4.

A Dump load 104 and/or 140 is applied in the wind turbine generator 1, and normally it is only operating to absorb the energy during faults. Therefore in the majority time of wind turbine generator operation, the dump load 104 or 140 is not applied, and its health condition is unknown. The present invention is about a method to check the dump load condition during normal operation or prior to operation.

Figure 2:
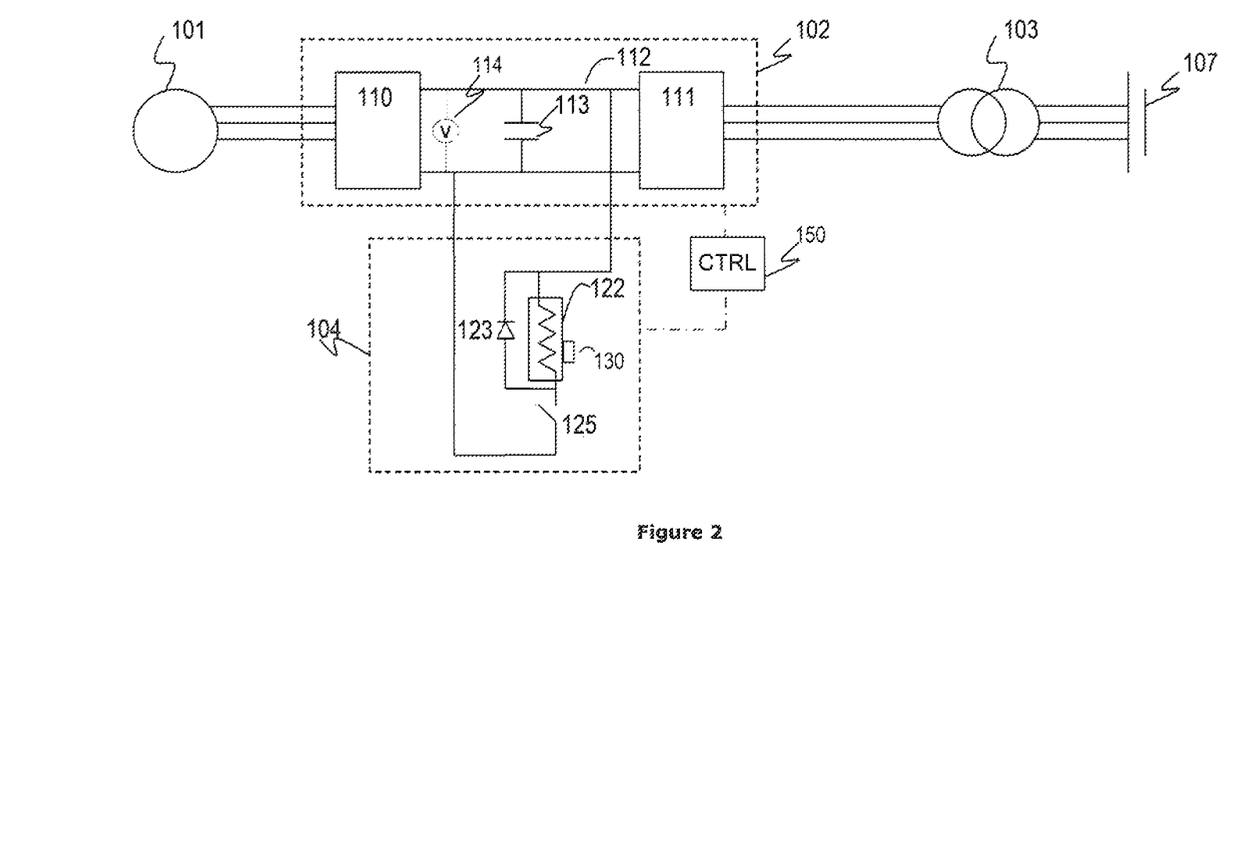
FIG. 2 Dump load circuit connected to DC link

FIG. 2 shows an electrical system of the wind turbine according to an embodiment. The electrical system includes a generator 101, a power converter 102, a main transformer 103, and a dump load system 104. The power converter 102 includes a generator-side converter 110 and a grid-side converter 111 connected via a direct current (DC) link 112. The DC link 112 includes a DC link capacitor 113. The generator 101 converts mechanical energy to electrical energy having AC (alternating current) voltage and current (collectively referred to as "AC signals"), and provides the generated AC signals to the generator-side converter 110. The AC signals from the generator have a variable frequency, due to varying wind speed. The generator-side converter 110 converts or rectifies the AC signals to a DC (direct current) voltage and a DC current which is placed in the DC link 112. The grid-side converter 111 converts the DC signals on the DC link 112 into fixed frequency AC signals for a power grid 107. The power comprising the fixed frequency AC signals at the output of the grid-side converter 111 is stepped up by the main transformer 103 into a level suitable for to be received and transmitted by the power supply grid 107.

It should be noted that the electrical system described with reference to FIG. 2 is only an example of the electrical configuration of the wind turbine and only the main components are shown to illustrate the embodiments. The present invention should not be limited to the exact electrical system configuration shown in FIG. 2.

Other electrical configurations are possible. Also, different components in the electrical system of the wind turbine are not shown in FIG. 2. For example, the electrical system may include filters between the generator 101 and the power converter 102, and between the power converter 102 and the main transformer 103 Also, there may be switches arranged at various locations for connecting or disconnecting certain components of the turbine. Controllers for controlling the converters 110, 111 are also not shown in FIG. 2.

The dump load circuit 104 in FIG. 2 is coupled to the DC link 112 of the power converter 102. The chopper circuit 104 includes a power dissipating resistor 122, a blocking diode 123 and a switch element 125. Both the switch element 125 and the power dissipating resistor 122 may have a temperature measurement sensor 130 installed, either on the surface of the component or inside the component.

The operation of a wind turbine with a dump load circuit according to FIG. 2 is described here, it relates more to how the dump load is used, than it relates to the test of the dump load, but the description is useful for understanding the objective problem solved by the invention.

During normal operation of the wind turbine, the electrical power generated by the generator is converted by the power converter 102 into power having fixed frequency AC signals to be supplied to the power grid 107. The 125 is open, and hence no power flows into the chopper circuit 104. A controller (not shown) constantly detects whether there is a power imbalance event which cause the power flow from the generator to the grid to be imbalanced. As mentioned earlier, the power imbalance event may be a voltage dip in the power supply grid 107 (low voltage event) or when there is a sudden wind gust causing a sudden increase in the rotational speed of the blades of the wind turbine (wind gust event).

These events result in the electrical power generated by the generator 101 to be more than the power supplied to the power grid 107, resulting in excess electrical power or energy. Excess electrical power if not transferred to the grid or dissipated properly will lead to an increase in DC-link 112 voltage. If DC link chopper is malfunctioning a too high DC link voltage will result in over voltage, which could cause the DC-link capacitors and IGBT switches on both converter sides to fail.

The controller 150 may also sense the voltage at the output of grid side converter 111 or at the power grid 107 directly, for example, at the PCC (not shown) to the power grid 107 to determine whether there is any voltage dip which results in the power imbalance event. It is also possible to determine whether a wind gust event has occurred by determining the wind speed or rotational speed of the rotor. Wind speed may be determined using wind anemometers (not shown) commonly placed on top of the nacelle 3 of the turbine. When the wind speed is determined to have increased substantially over a short period of time, a wind gust event is detected.

Whenever the wind turbine generator is operated without activating any of the dump load circuits 104, 140 it is operating in a non-fault operation mode in respect to the dump load circuits 104, 140.

It should be noted that the generator 101 and the power converter 102 are usually placed inside the nacelle 3 of the turbine 1. The main transformer 103, the chopper circuit 104 may also be placed inside the nacelle or outside the nacelle, for example in the tower or at the based of the turbine.

Figure 3:
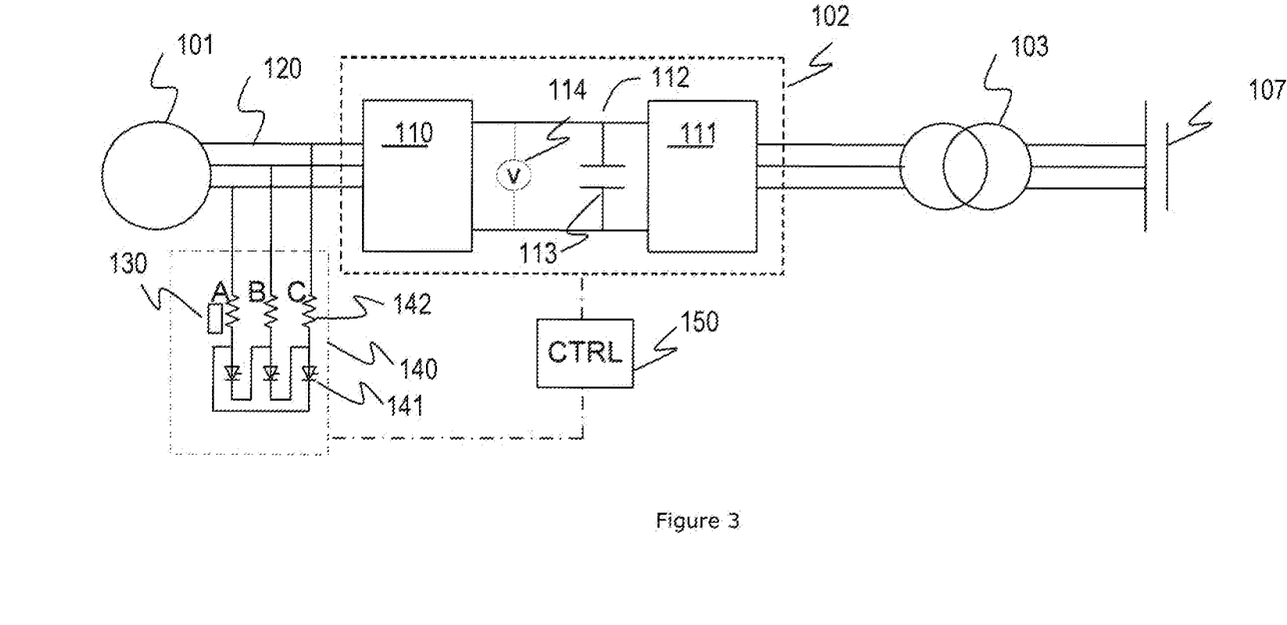
FIG. 3 Dump load circuit connected to AC terminals of generator side converter

FIG. 3 shows another electrical system of the wind turbine according to an embodiment. The electrical system in FIG. 3 is similar to that shown in FIG. 2, except for the configuration of the dump load circuit 140 and the coupling of the energy management arrangement 140 to the AC terminals of the generator 101. In the electrical system in FIG. 3, the energy management arrangement 140 is coupled to the input of the power converter 102, i.e. the AC side of the generator side converter or the dump load circuit 140 is coupled to the stator windings 120 of the generator 101.

The dump load circuits in FIG. 2 and FIG. 3 can be tested differently. Two embodiments will be presented. In one embodiment which applies only to a chopper circuit 104 that is coupled to the DC link 112 as in FIG. 2. Where as another embodiment can be applied to both dump load arrangements 104 and 140, FIG. 2 and FIG. 3.

The first embodiment is applied in a wind turbine generator 1 as described in FIG. 1 and FIG. 2 by switching on the chopper 104 for a short period of time, i.e. a chopper checking pulse 52. I could be done during the normal operation; a pulse can be generated from a controller (not shown) to turn on the dump load switch 125. The pulse 52 result in energy dissipation in the dump load resistor 122 if the chopper 104 is working properly and the energy balance in the DC-link capacitor 113 will be affected, a result of that will be a short decrease in the DC-link 112 voltage level that can be measured, by a DC link measurement 114. The voltage drop should be small enough so that the normal operation of the wind turbine generator 1 is not affected.

Since the DC voltage is always monitored by the converter controller 150, the small drop voltage can be captured and treated as a health signal of the chopper.

Figure 4:
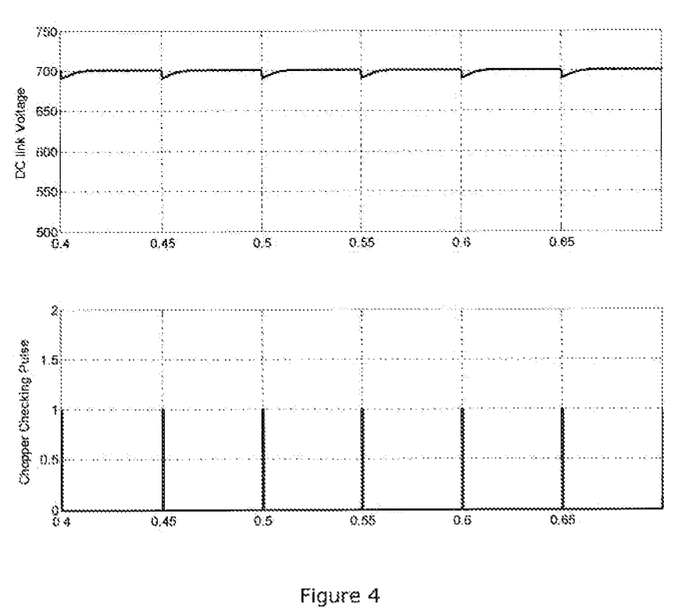
FIG. 4 DC link voltage measurements

FIG. 4 shows a repeated test of the status of the chopper 104. The upper FIG. 4 shows the DC link voltage level and the lower FIG. 4 shows the chopper checking pulses. The test is repeated every 50 ms and the chopper checking pulses have a duration of a few milliseconds. The checking frequency can be set from check every hour, or even every week depending on the aging of the chopper.

A counter can be used to count a track result of the dump load circuit 104, 140. If a large number of unhealthy counts are accumulated, it is very likely that the chopper is faulty. Although the tests shown in FIG. 5 to FIG. 7 could indicate that a single failed test means that the wind turbine generator is not functioning. That is not the case, but a failed test should be registered and could be added to a counter. If the number in the counter is higher compared to other similar turbines it is likely the dump load is malfunctioned.

In a practical embodiment the chopper circuit will be implemented in a electrically noisy environment, which means that the DC link voltage level 54 can be influenced by many disturbances, therefore it is important to ensure synchronisation with the chopper checking pulses and the DC link measurements 114. By doing so the DC link measurements 114 only needs to be analysed for small voltage dips after a chopper checking pulse. The trigger pulse to close the chopper switch 125 can even be used to trigger the DC link voltage measurement 114.

The second embodiment is also applied by switching the chopper 104 or dump load 140 for a short period of time. Like for the first embodiment. The description of the second embodiment will be divided into how it can be applied for the DC link chopper 104 and how it can be applied for the AC dump load 140.

When applying the dump load for short periods of time some energy will be dissipated into the resistor 122, a result of this will be temperature rises in the resistor 122. Measuring the temperature by means of a temperature sensor 130 before and after applying the resistor will give a status of the dump load. The temperature sensor 130 can be any kind of temperature sensors known to the person skilled in the art, often in this kind of resistor a PT100 sensor is used; other temperature dependant resistor such as NTC or PTC types can also be used. Due to reliability it is common to have a redundant temperature sensor in the resistor.

Testing the DC link chopper 104 according to the second method can be done either by dosing the switch 125 in one defined time interval. The interval can be between 100 ms to 800 ms. The interval depends on the thermal capacity of the resistor 122; it has to be long enough to cause a measurable temp difference in the resistor, on the other hand it should not cause a temperature raise that will Berate the performance of the system in a way that the DC link chopper 104 can't be used for it intention right after a test. The response in the temperature measurements is not instantaneous due the thermal time constant of the resistor 122. The thermal time constant would also apply to the resistor(s) 142.

As an alternative to closing the switch 125 in one interval, the switch 125 can be operated with a duty-cycle, where it will be closed and opened, for a longer period of time. The duty cycle means that the switch 125 is closed for example 10% of the time and opened for 90% of the time; other duty cycles can of course also be applied. The accumulated time where the switch is closed will be similar to the one single interval. The advantages of operating with a duty cycle, is that the DC link 112 voltage level will not drop as deep as if all the energy was dissipated into the resistor at once. The duty cycle operation will cause the DC link voltage to look similar to the upper FIG. 4 DC link voltage level 54, but with a smaller DC link voltage dips.

The dump load 140 can, as the DC link chopper 104, be tested either by closing all the switches 141a, 141b and 141c for one interval or by operating it with a duty cycle. The dump load resistor 142 may consist of a unit where all three resistors have one temperature measurement sensor or one for each resistor, the later is more likely to be used.

Whereas the switch 125 in the DC link chopper 104 often is a self commutated switch type, such as an IGBT, are the switches in the dump load 140 often a forced commutated type of switch, such as a thyristor. This means that the thyristor switch can only be opened at a zero crossing. Therefore are there some restrictions to the time interval.

Applying the dump load for one interval could cause torque fluctuation in the mechanical drive train of the wind turbine generator 1, unless the generator side converter 110 reduces the power similar to the power dissipation in the resistor. Whereas duty cycle operation of the switch(es) 141a, 141b 141c would have a minor effect on the mechanical torque. The duty cycle can either be operated in a way so the thyristor switches 141a, 141b 141c each is closed for a number of half periods and then open for a larger number of half periods, or more advanced by controlling the trigger pulse to start at an angle alpha for a specified period of time or until a given temperature change have happened.

Although FIG. 3 shows a dump load 140 with three switches 141, the same method could be used in an embodiment where the three phase AC signal of the generator 101 is rectified, in a simple diode rectifier, to DC. Then a chopper circuit like 104 could be applied.

Figure 5:
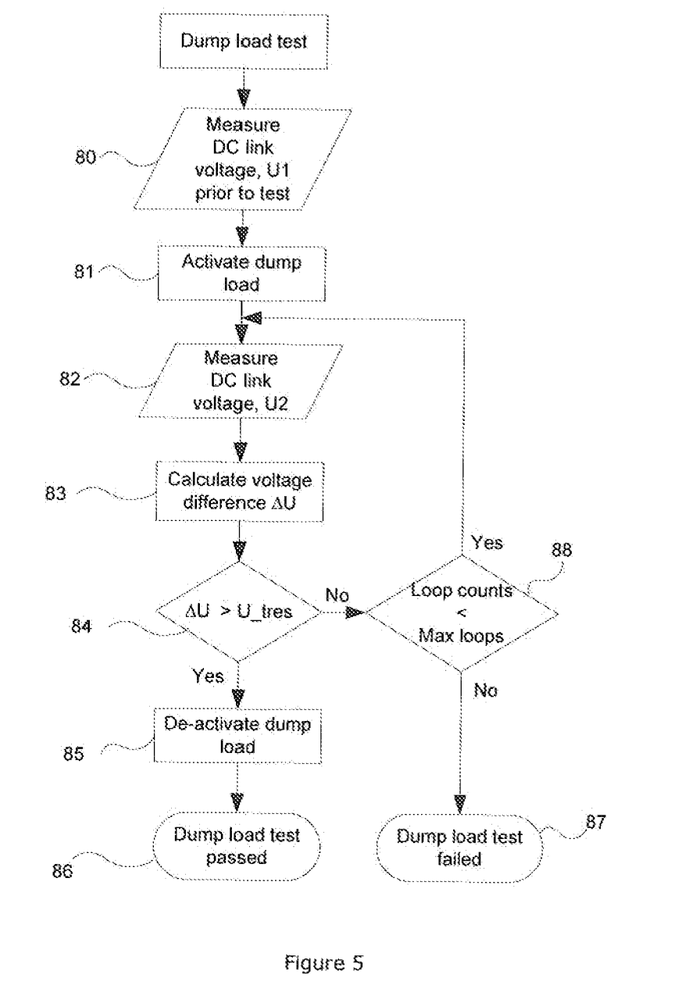
FIG. 5 flow chart according to an embodiments of the present invention
Figure 6:
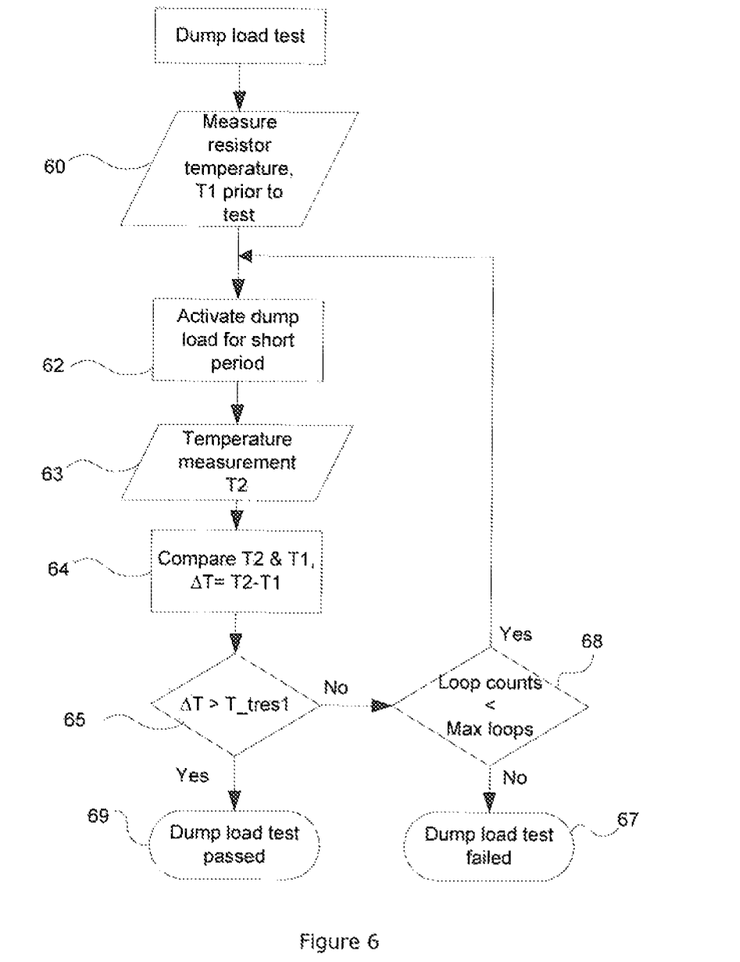
FIG. 6 flow chart according to an embodiments of the present invention
Figure 7:
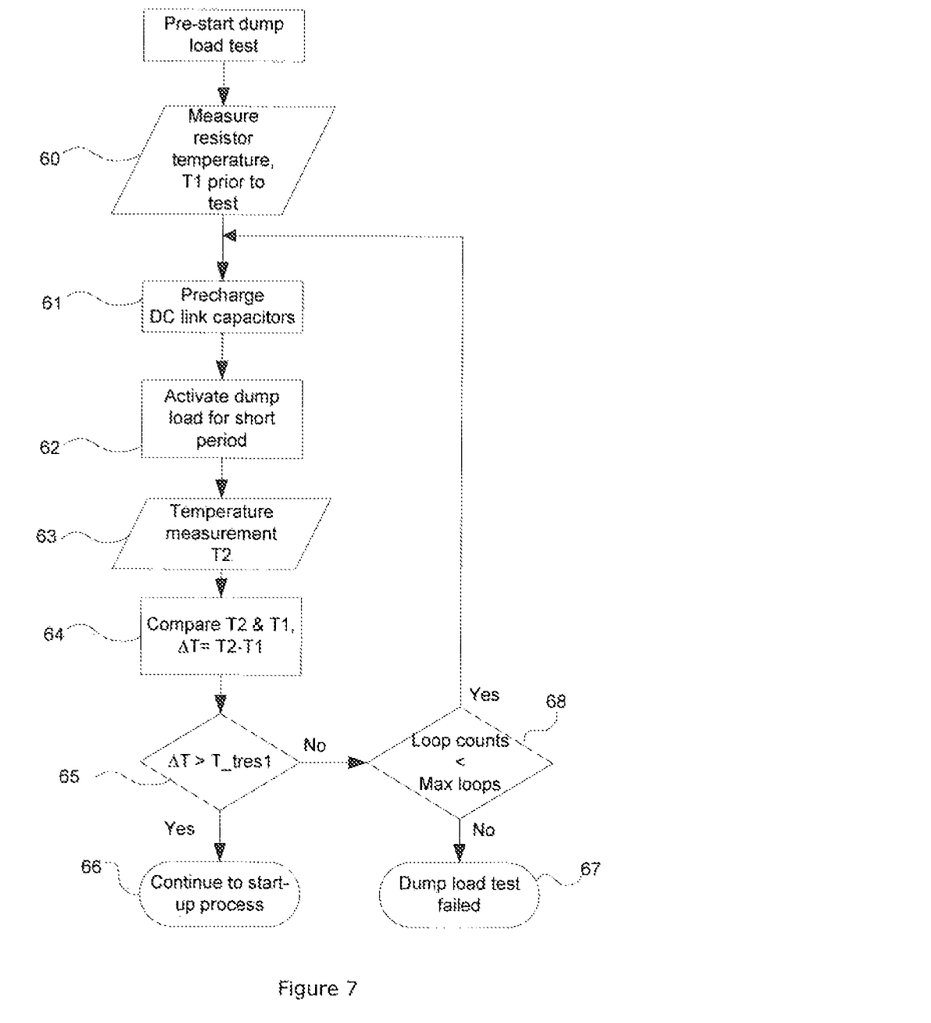
FIG. 7 flow chart according to an embodiments of the present invention

FIG. 5, FIG. 6 and FIG. 7 shows flow charts of the various steps of different implementations of the invention.

FIG. 5 shows the steps of the method where the dump load is tested by monitoring the DC link voltage level. An initial DC link measurement is performed; step 80, to be used later for a comparison. The dump load is activated, by applying the switch 125, step 81, for a given period of time. While the switch 125 is turned on a second DC link measurement is performed, step 82 and the voltage difference $\Delta U$ between first and second measurement is calculated, step 83. In step 84 is $\Delta U$ compared with a threshold value U_tres. If $\Delta U$ is greater than the threshold value U_tres, the test 84 is passed and continues to step 85 where the dump load is deactivated. If the $\Delta U$ is not greater U_tres the loop counter "loop counts" is incremented, and if the count is less than Max loops the method continues at step 82. If the loop counter hits the number of Max loops it is an indication that the dump load 104 has failed the test, step 87.

The amount of energy absorbed by the dump load resistor 122 and the size of the DC link capacitor 113 will influence on the number of loops, step 82-84+step 85. There will of course be a sampling time interval Ts since this kind of system is likely to be implemented in a digital control systems 150. The sampling time interval will also have an effect on the number of loops, i.e. the longer the sampling time interval the longer is the dump load activated.

FIG. 6 shows the steps of the method where the dump load 104, 140 is tested by monitoring the temperature of the dump load resistor 122 or 142.

An initial temperature measurement is performed with the temperature sensor(s) 130, step 60, to be used later for a comparison. The dump load is activated, by applying the switch 125, step 62, for a given short period of time, such as 100 ms-800 ms. After the dump load switch 125, 142 is turned off again a second temperature measurement is performed, step 63 and the temperature difference $\Delta T$ between first and second measurement is calculated, step 64. In step 65 is $\Delta T$ compared with a threshold value T_tres1. If $\Delta T$ is greater than the threshold value T_tres1 the dump load test is passed. If the $\Delta T$ is not greater T_tres1 the loop counter "loop counts" is incremented, and if the count is less than Max loops the method continues at step 62. If the loop counter hits the number of Max loops it is an indication that the dump load 104, 140 is malfunctioning, and the test has failed, step 68.

In one embodiment of the invention the test of the dump load could also be performed right after pre-charge of the DC link capacitor before power production. Pre-charge will occur as one of the first thing in a start up sequence when powering up the electric power converter 102. FIG. 7 shows a flow chart of the embodiment where the test is performed after the DC link pre-charge 61. The method is very similar to the one shown in FIG. 6, except that the DC link capacitor 113 is not charged prior to the test, and the wind turbine generator 1 is not in operation mode The controller 150 is in function.

An initial temperature measurement is performed with the temperature sensor(s) 130; step 60, to be used later for a comparison. The DC link capacitor is pre-charged with a pre-charged circuit (not shown), that is is well known in the art of grid connected frequency converters. The purpose of the pre-charge is to energize the DC link capacitor prior to starting operation of the grid side converter 111. After the pre-charge the dump load is activated, by applying the switch 125, step 62, for a given short period of time, such as 20 ms-200 ms, it could be even longer. After the dump load switch 125, 142 is turned off again a second temperature measurement is performed, step 63 and the temperature difference ΔT between first and second measurement is calculated, step 64. In step 65 is ΔT compared with a threshold value T_tres1. If ΔT is greater than the threshold value T_tres1 the dump load test is passed. If the ΔT is not greater T_tres1 the loop counter "loop counts" is incremented. If the count is less than Max loops the method continues at step 61, where the pre-charge circuit is applied once more If the loop counter hits the number of Max loops it is an indication that the dump load 104, 140 is malfunctioning, and the test has failed, step 68. For the pre-start test the number of loops should be limited to only a few, say 2-5. For both tests shown in FIG. 6 and FIG. 7 it has to be noted that the response in the temperature measurements are not as fast as it is the case for the DC link voltage measurement. This is due to the thermal time constant of the resistor 122, 142.

The electrical power converter 102 in wind turbine generators is often made of a number of converter modules, not only divided into a grid side converter and a generator side converter. The modularity is made so the electrical power converter 102 is made with a number of parallel modules, each functioning independently of the other modules, each module could also be connected so if a function failed in one module, the electrical power converter 102 can fully function, perhaps in reduced power production, by using the failed function in the neighboring module. An example of this could be if the present invention has detected a failed dump load 104 or 140 in one of the power modules, then the wind turbine generator 1 can still produce power and fulfill grid connection requirements if the other power modules have dump load systems that work. Depending on the wind speed and the state of the dump load 104 or 140, the wind turbine generator will scale its production.

In summary the invention relates to a dump load applied in a wind turbine generator; normally it is only operating to absorb the energy during faults. Therefore in the majority time of wind turbine generator operation, the dump load is not applied, and its health condition is unknown. This invention is about a method to check the dump load condition during normal operation.

Any range or device value given herein may be extended or altered without losing the effect sought, as will be apparent to the skilled person.

It will be understood that the benefits and advantages described above may relate to one embodiment or may relate to several embodiments. It will further be understood that reference to 'an' item refer to one or more of those items.

It will be understood that the above, description of a preferred embodiment is given by way of example only and that various modifications may be made by those skilled in the art. The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention.

The invention claimed is:

1. A method of monitoring health of a dump load circuit in a wind turbine generator, the dump load circuit configured to dissipate energy generated by the wind turbine generator during a fault operation of the wind turbine generator, the method comprising: performing, while the dump load circuit is inactive, a first measurement of at least one signal associated with operation of the dump load circuit; activating the dump load circuit to begin dissipating energy during non-fault operation of the wind turbine generator; performing a second measurement of the at least one signal after activating the dump load circuit; and comparing the first and second measurements of the at least one signal to monitor health of the dump load circuit.

2. The method according to claim 1, wherein the dump load circuit is connected to a DC link of a power electronic converter for converting electrical power that is supplied to a power supply grid.

3. The method according to claim 2, wherein the dump load circuit is connected to an AC side of a generator.

4. The method according to claim 2, wherein said at least one signal is indicative of a voltage of the DC link.

5. The method according to claim 1, wherein said at least one signal is indicative of a temperature of at least one dump resistor of the dump load circuit.

6. The method according to claim 1, further comprising:
repeating the acts of performing the measurement,
activating the dump load circuit, performing the secured measurement, and
comparing the first and second measurements according to a schedule.

7. The method according to claim 1, wherein activating said dump load circuit includes activating the dump load circuit with a plurality of pulses generated via a controller.

8. A test system for a dump load circuit in a wind turbine generator, the dump load circuit configured to dissipate energy generated by the wind turbine generator during a fault operation of the wind turbine generator, the test system comprising:
a sensor for performing a first and a second measurement of at least one signal associated with operation of the dump load circuit; and
a processor configured for:
initiating activation of the dump load circuit to begin dissipating energy during non-fault operation of the wind turbine generator,
taking the first and second measurements before and after, respectively, the activation of the dump load circuit, and
comparing the first and second measurements of the at least one signal.

9. The test system according to claim 8, wherein the dump load circuit is connected to a DC link of a power electronic converter for converting electrical power provided to a power supply grid.

10. The test system according to claim 9, wherein the dump load circuit is connected to an AC side of a generator.

11. The test system according to claim 9, wherein said at least one signal is indicative of a voltage of a DC link.

12. The test system according to claim 8, wherein said at least one signal is indicative of a temperature of a dump resistor of the dump load circuit.

13. The test system according to claim 8, wherein said processor is configured to:
initiate activation of the dump load circuit,
take the first and second measurements, and
compare the first and second measurements according to a schedule.

14. The test system according to claim 8, wherein said processor is configured to activate said load dump circuit with a plurality of pulses.

15. The method according to claim 6, further comprising:
  storing results from comparing the first and second measurements.

16. The method of claim 1, wherein fault operation occurs responsive to a power imbalance event.

17. The method of claim 16, wherein the power imbalance event includes one or more of a low voltage event in the power supply grid, and a wind gust event at the wind turbine generator.

18. The test system of claim 8, wherein the fault operation occurs responsive to a power imbalance event.

19. The test system of claim 18, wherein the power imbalance event includes one or more of a low voltage event in the power supply grid, and a wind gust event at the wind turbine generator.

* * * * *